(12) United States Patent
Welle et al.

(10) Patent No.: US 11,549,838 B2
(45) Date of Patent: Jan. 10, 2023

(54) FILL LEVEL MEASURING DEVICE

(71) Applicant: VEGA GRIESHABER KG, Wolfach (DE)

(72) Inventors: Roland Welle, Hausach (DE); Joerg Boersig, Oberwolfach (DE); Steffen Waelde, Niedereschach (DE)

(73) Assignee: VEGA GRIESHABER KG, Wolfach (DE)

(*) Notice: Subject to any disclaimer, the term of this patent is extended or adjusted under 35 U.S.C. 154(b) by 300 days.

(21) Appl. No.: 16/870,654

(22) Filed: May 8, 2020

(65) Prior Publication Data
US 2020/0355536 A1 Nov. 12, 2020

(30) Foreign Application Priority Data

May 9, 2019 (EP) ..................................... 19173504

(51) Int. Cl.
| | | |
|---|---|---|
| *G01F 23/284* | (2006.01) | |
| *G08B 21/18* | (2006.01) | |
| *G08B 25/10* | (2006.01) | |
| *G01P 15/18* | (2013.01) | |
| *G01S 19/42* | (2010.01) | |

(52) U.S. Cl.
CPC ......... *G01F 23/284* (2013.01); *G08B 21/182* (2013.01); *G08B 25/10* (2013.01); *G01P 15/18* (2013.01); *G01S 19/42* (2013.01)

(58) Field of Classification Search
CPC ........ G01F 23/284; G01F 23/00; G01F 25/20; G08B 21/182; G08B 25/10; G08B 21/18; G01P 15/18; G01S 19/42
See application file for complete search history.

(56) References Cited

U.S. PATENT DOCUMENTS

| 3,133,192 A | 5/1964 | Rogers |
| 4,461,576 A | 7/1984 | King |
| (Continued) | | |

FOREIGN PATENT DOCUMENTS

| EP | 3 598 082 A1 | 1/2020 | |
| JP | 3700241 B2 * | 9/2005 | ............. G01B 11/02 |
| (Continued) | | | |

OTHER PUBLICATIONS

European Search Report issued in Application No. 19 17 3504.2, dated Oct. 16, 2019, citing references AA-AC, there in. 8 pages.

*Primary Examiner* — Quan Zhen Wang
*Assistant Examiner* — Mancil Littlejohn, Jr.
(74) *Attorney, Agent, or Firm* — Oblon, McClelland, Maier & Neustadt, L.L.P.

(57) ABSTRACT

A fill level measuring device for measuring a fill level of a container including a fill level measuring circuit that measures a filling level of a container, at least one transmitter/receiver that communicates with data processing circuitry, at least one fastener that fastens the fill level measuring device to a surface of the container, at least one monitoring circuit that monitors a fastening of the fill level measuring device to the container by the at least one fastener, the monitoring circuit further transmits an alarm message to the data processing circuitry via the transmitter/receiver when the monitoring circuit detects a loosening of the fastening of the fill level measuring device from the container.

14 Claims, 6 Drawing Sheets

(56) References Cited

U.S. PATENT DOCUMENTS

| | | | |
|---|---|---|---|
| 6,349,823 B1* | 2/2002 | Innis | B65D 75/30 |
| | | | 206/308.1 |
| 7,998,510 B2* | 8/2011 | Caswell | A61P 1/00 |
| | | | 424/606 |
| 8,502,661 B2* | 8/2013 | Mauro | G08B 25/001 |
| | | | 340/539.3 |
| 9,355,545 B2* | 5/2016 | Nekoogar | G06K 19/07798 |
| 10,220,577 B1* | 3/2019 | Ehlert Taylor | G01P 15/18 |
| 2010/0101317 A1* | 4/2010 | Ashrafzadeh | G01F 23/26 |
| | | | 702/188 |
| 2018/0292519 A1* | 10/2018 | Larsson | H01Q 13/02 |
| 2019/0056258 A1 | 2/2019 | Gelada Camps et al. | |
| 2020/0132533 A1 | 4/2020 | Welle et al. | |

FOREIGN PATENT DOCUMENTS

| | | | | |
|---|---|---|---|---|
| WO | 2020/016361 A1 | 1/2020 | | |
| WO | WO-2020212185 A1 * | 10/2020 | | G01D 21/00 |

\* cited by examiner

FILL LEVEL MEASURING DEVICE

REFERENCE TO RELATED APPLICATIONS

The present application claims priority to European patent application No. 19 173 504.2, filed on May 9, 2019, which is fully incorporated by reference in the present document.

FIELD

The present disclosure relates to a fill level measuring device for measuring a filling level of a container, and a system comprising at least one such fill level measuring device and a container.

BACKGROUND

Fill level measuring devices are well known in the state of the art. Often a distance between the fill level measuring device and a surface of a medium arranged in a container is determined by applying different physical effects and the level of the container is derived. Such fill level measuring devices can be arranged inside or outside a container, whereby in particular acoustic, electromagnetic, inductive, capacitive or also radiometric sensor arrangements are used. The recorded data/measured values are transmitted to a higher-level data processing unit using wired or wireless communication devices. The acquired measured values can be used not only as process parameters, but also for inventory management.

The most common fill level measuring devices are supplied with energy for operation via fixed wire connections. More recent developments, however, also make it possible to provide energy to the various components using self-sufficient energy sources, so that in combination with wireless communication equipment, it is possible to provide self-sufficient units. Such self-sufficient units can be used in a particularly advantageous way for non-stationary containers. One of the container types frequently used as non-stationary is the so-called Intermediate Bulk Container, also known as IBC container. IBC containers have a volume- and weight-optimized design, which enables them to be loaded onto trucks using forklift trucks in particular. In practice, however, it has been found that smaller collisions occur from time to time, particularly during loading and unloading operations, which can lead to mechanical deformation of the container and the fill level measuring device may become detached.

If such a detachment of the fill level measuring device from the container is not detected, this can lead to the fill level measuring device measuring the distance to any object in its vicinity and therefore transmitting faulty measurement values to the higher-level data processing unit, with the consequence that the goods and stock management based on this is faulty.

In the light of this issue, it is an object of the present disclosure to provide a fill level measuring device and a system with such a fill level measuring device in which faulty measurements can be excluded with higher reliability, especially when a fill level measuring device is used as a self-sufficient unit.

These and other objects, which are mentioned when reading the following description or can be identified by the skilled person, are solved by the subject matter of the independent claims. The dependent claims further develop the central idea of the present disclosure in a particularly advantageous way.

SUMMARY

The present disclosure provides a fill level measuring device for measuring a level of a container, the fill level measuring device comprising a fill level measuring unit (fill level measuring circuit), arranged to measure a filling level of a container, at least one transmitting/receiving unit (transmitter/receiver), arranged to communicate with a data processing unit (data processing circuitry); at least one fastening unit (fastener), arranged to fasten the fill level measuring device to a surface of the container; at least one monitoring means (monitoring circuit), configured to monitor a fastening of the fill level measuring device to the container provided by the at least one fastening unit, wherein the monitoring means are further configured to transmit an alarm message to the data processing unit via the transmitting/receiving unit when the monitoring means detect a detachment of the fastening of the level measuring device from the container.

In other words, the present disclosure proposes to equip a fill level measuring device with a monitoring means for monitoring an intended arrangement of the fill level measuring device on a container so that faulty measurements due to an incorrect arrangement of the fill level measuring device on the container or a dropping of the fill level measuring device from the container can be excluded as far as possible. The monitoring means are preferably set up in such a way that they can detect not only a complete detachment of the fill level measuring device from the container, but also an incorrect arrangement of the fill level measuring device on a container due to a partial failure of the fastening unit.

A fill level measuring device according to the present disclosure can be arranged on any suitable surface in or on a container, wherein the fill level measuring device does not necessarily have to be arranged directly on a surface of the container, but can also be arranged at a distance from a surface of the container, for example on a suitable housing or grid section of an IBC container. A fill level measuring unit according to the present disclosure means any unit which is arranged to measure a level of a container by applying acoustic, electromagnetic, inductive, capacitive, radiometric or other effects. However, the use of the present disclosure is not limited to the measurement of certain media, but includes all media regardless of their aggregate state.

According to the present disclosure, an emitting/receiving unit according to the present disclosure means any communication device with which data can be exchanged with a data processing unit. The transceiver unit is set up for wireless communication with the data processing unit, the transceiver unit comprising a Wireless Area Network (WLAN) interface, a Bluetooth interface, a ZigBee interface, a Long Range Wide Area Network (LoRaWAN) interface, a Sigfox interface, a Narrowband IoT (NB-IoT) interface, a MIOTY interface or a mobile radio interface.

A data processing unit according to the present disclosure can be a central data processing unit, for example a central control computer or a data processing unit for goods and stock management, whereby the present disclosure is not limited to a specific data processing unit. For example, decentralized cloud storage and/or decentralized cloud computing solutions can also be used.

A fastening unit according to the present disclosure includes any means by which the fill level measuring device can be fastened to the container. For example, the fastening unit may comprise an adhesive layer, an acrylic adhesive layer, by which the fill level measuring device has been adhered to the container. Alternatively or additionally, the fastening unit may comprise one or more tensioning or banding elements with which the fill level measuring device can also be fixed to a container.

An alarm message in accordance with the present disclosure may, for example, be transmitted as a data set which can be displayed on a display device of the data processing unit. Such an alarm message may alternatively or additionally also be transmitted to a tablet, smartphone or the like, for example to simplify and/or initiate the deployment of a service technician.

Advantageously, the monitoring means are further set up to deactivate the fill level measuring device or the fill level measuring unit after transmission of the alarm message. This ensures that no or only a few incorrect measured values are transmitted to the data processing unit, which could possibly lead to faulty control signals or automated goods disposition. In this context, it may be advantageous that the data processing unit is set up to mark the measured values of a predetermined period of time before receipt of an alarm message as "possibly faulty measured values" so that they are not used for a control signal or goods planning.

It is also advantageous that the fill level measuring device further comprises at least one position determining means, for example a GPS unit, and this is set up to transmit position data of the fill level measuring device to the data processing unit via the transmitter/receiver unit, the alarm message comprising position data of the fill level measuring device. The position data are advantageously also transmitted to a tablet, smartphone or the like of a service technician. In this context it is advantageous if the position data can also be transmitted via the transmitter/receiver unit after deactivation of the fill level measuring device or the fill level measuring unit, in particular if the fill level measuring device has detached itself from the container, for example during a loading or unloading process, and is therefore no longer located in the immediate proximity of the container.

In a first embodiment of the present disclosure, the monitoring means comprise at least one acceleration sensor which is arranged to detect an acceleration of the fill level measuring device at least in one direction parallel to the acceleration due to gravity, the acceleration sensor being a 3-axis acceleration sensor. In this context, the monitoring means are set up to evaluate the acceleration values of the acceleration sensor in order to determine whether there is any detachment of the fastening of the fill level measuring device from the container. Since typical acceleration patterns occur in particular during loading and unloading of mobile containers, these typical acceleration patterns can be stored in a memory unit of the monitoring means and compared with the acceleration patterns actually occurring. The acceleration sensor is aligned in such a way that it measures the acceleration due to gravity. If the position of an acceleration sensor aligned in this way changes to the extent that it no longer measures the acceleration due to gravity, it can be assumed with a high degree of probability that the fill level measuring device is no longer attached to the container in the intended position and is no longer held in the intended position on the container by the fastening unit. In this connection it should be noted that an evaluation of the acceleration values is carried out directly in a data processing unit/processor unit of the fill level measuring device. Alternatively or additionally, however, the acceleration values can also be transmitted to another data processing unit/processor unit via the transmitter/receiver unit and evaluated in this data processing unit/processor unit.

In a second embodiment of the present disclosure, the monitoring means comprise a close-range transceiver unit arranged for wireless communication with a close-range transceiver unit arranged on the container. In this context the close-range transceiver unit is an RFID transceiver unit which is set up for wireless communication with an RFID transceiver unit arranged on the container or is an NFC transceiver unit which is set up for wireless communication with an NFC transceiver unit arranged on the container. In this case, a close-range transmitting/receiving unit of the monitoring means is understood to be any transmitting/receiving unit which has a distance-dependent transmitting/receiving power. Thus, in case of loss of the fill level measuring device, the corresponding transmitting/receiving units can no longer establish wireless communication and a detachment of the fill level measuring device from the container can be determined or the respectively received signal strengths drop corresponding to the distance of both transmitting/receiving units so that a detachment or a faulty position of the fill level measuring device can be determined.

Alternatively or additionally, the monitoring means can comprise at least one electrical, optical, magnetic, acoustic or mechanical sensor which can interact with a detection means provided on the container or the fastening unit.

In a third embodiment of the present disclosure, the fill level measuring device is arranged to determine a fill level based on a transit time measurement of a signal emitted and reflected onto the fill level measuring device, for example a radar signal or a microwave signal. In this case, the monitoring means are arranged to evaluate the reflected signal and to determine a loosening of the fastening of the fill level measuring unit from the container. The reflected signal is not only reflected by the medium whose fill level should be determined in the container, but at least partly also by other boundaries which appear as so-called echoes in the reflection pattern. For known arrangements of the fill level measuring device on known containers, certain reflection patterns result with regard to the echoes. These echoes can thus be used to determine a detachment from or an incorrect position of the fill level measuring device on the container, as in this case the reflection pattern changes noticeably with regard to the echoes. Also here it should be noted that an evaluation of the reflection pattern is carried out directly in a data processing unit/processor unit of the fill level measuring device. Alternatively or additionally, the values can also be transmitted to another data processing unit/processor unit via the transmitting/receiving unit and evaluated in this data processing unit/processor unit.

Furthermore, the present disclosure relates to a system, wherein the system comprises: a container for receiving a medium and at least one fill level measuring device described above, wherein the fill level measuring device is attached to the container by means of the fastening unit. The container is a receptacle or container intended for the transport of goods/media, for example a so-called Intermediate Bulk Container (IBC), a shipping container, a railway tank or a waste container.

DESCRIPTION OF THE FIGURES

In the following a detailed description of the figures is provided. It shows.

DETAILED DESCRIPTION

In the following description of the figures, the same reference signs are used for identical or similar objects, whereby only the respective differences are explained and the explanations therefore apply to all objects unless differences are explicitly explained.

Figure 1:
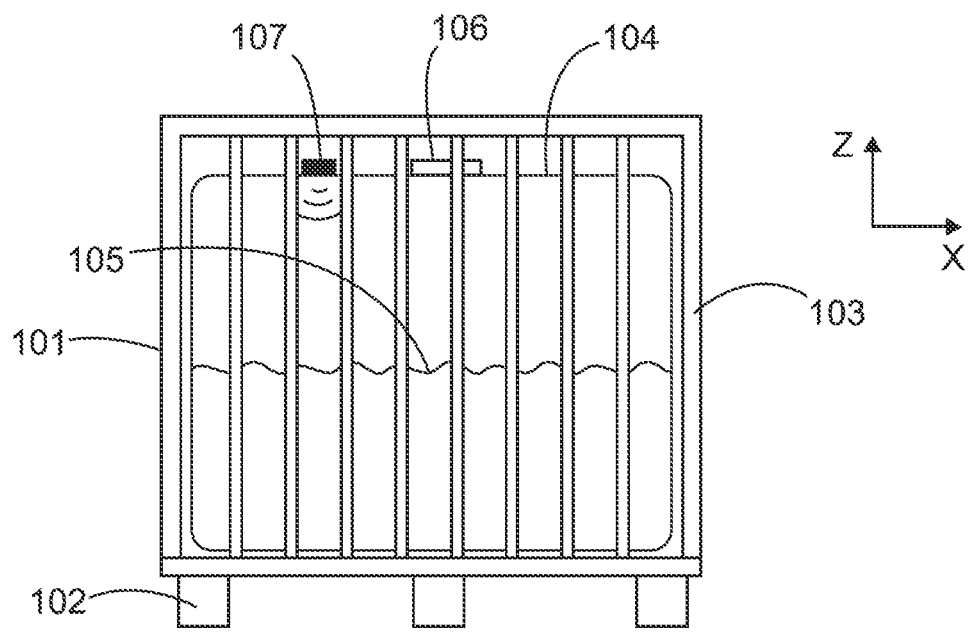
FIG. 1 a schematic view of a container with a fill level measuring device.

FIG. 1 shows an example of a so-called IBC 101, which is used to transport media. This weight-, volume- and cost-optimized design is particularly popular in the distribution and logistics industry, and enables customers to be easily supplied with a wide variety of media. The IBC 101 usually consists of a pallet 102, a metal frame 103 and a container bladder 104, for example made of plastic, which contains the medium 105. The medium 105 can be introduced into the container 101 or the container bladder 104 via a lid 106.

A fill level measuring device 107, which is typically mounted on an upper surface of the container bladder 104, can measure, for example, by using electromagnetic waves, the distance to the product surface 105 and provide it to the outside.

Figure 2:
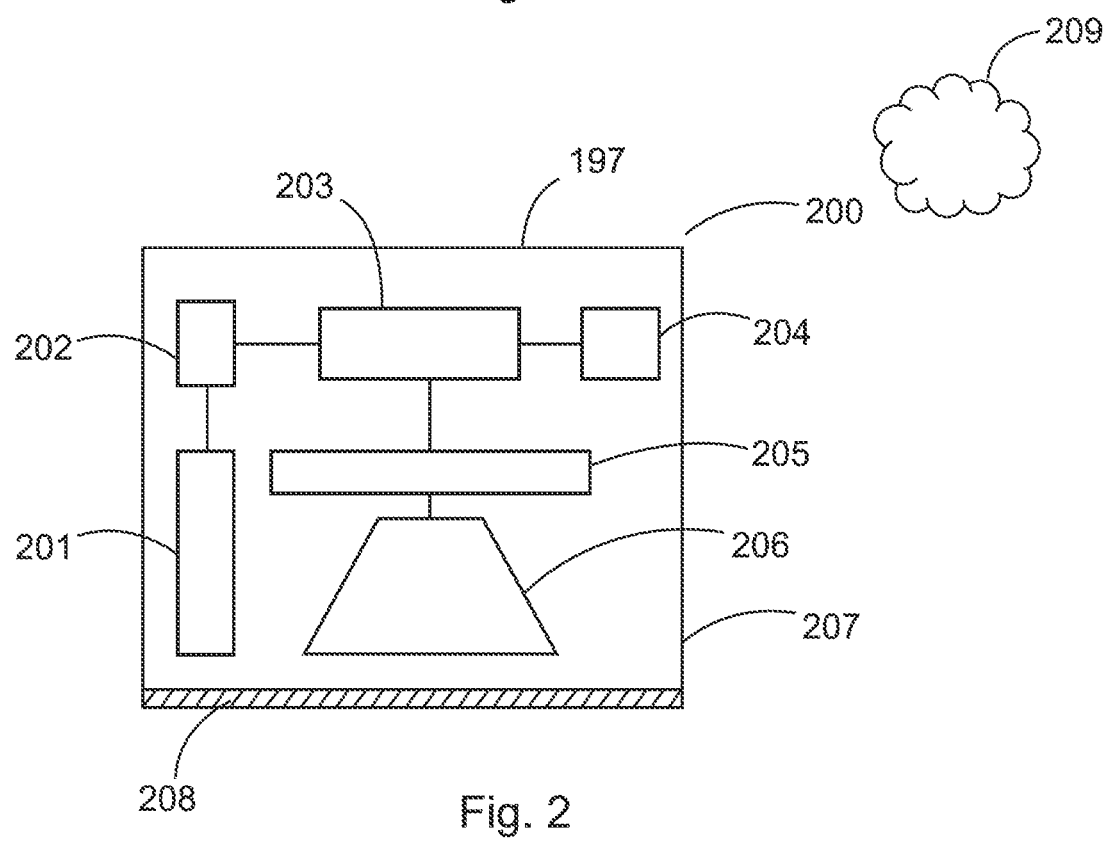
FIG. 2 a schematic view of the fill level measuring device in FIG. 1.

FIG. 2 shows a known fill level measuring device 107, in the form of a radar measuring device 200. The radar measuring device 200 comprises an energy storage unit 201, e.g. a battery 201, a power supply unit 202, a data processing unit in the form of a processor unit 203, a transmitter and receiver unit 204 for communication with a central data processing unit 209, a radio frequency unit 205, and a radar antenna 206. The radar measuring device 200 has a hermetically sealed housing 207.

The radar measuring device 200 emits radar signals via the radar antenna 206, for example in the range of 6 GHz, 24 GHz, 57 to 64 GHz, 75 to 85 GHz or higher frequencies, in the direction of a medium surface of the medium 105 and receives the signals reflected on the medium surface after an appropriate running time. The received signals are converted by the high frequency unit 205 into low frequency signals and transmitted to the processor unit 203 which calculates the distance to the product 105 and transmits it via the emitter/receiver unit 204 to a data processing unit 209, for example a combination of cloud memory and cloud computing solution 209.

The transceiver unit 204 is set up for wireless communication with the data processing unit 209, the transceiver unit 204 for example comprising a Wireless Area Network (WLAN) interface, a Bluetooth interface, a ZigBee interface, a Long Range Wide Area Network (LoRaWAN) interface, a Sigfox interface, a Narrowband IoT (NB-IoT) interface, a MIOTY interface or a mobile radio interface.

In practice, fill level measuring devices 107 are often attached to the surface of the container bladder 104 by means of an adhesive tape 208, for example an acrylic adhesive tape 208. The acrylate adhesive tape 208 seals the gap between the fill level measuring device 107 and the surface of the container bladder 104. In addition, the acrylate adhesive tape 208 serves as mechanical compensation layer to even out any unevenness of the surface of the container bladder 104. Alternatively or additionally, other fastening units/devices can be used, in which the fill level measuring device 107 is fastened, for example, with tapes that can be arranged around the metal frame 103. Other fastening possibilities are known to the skilled person and can be combined with the present embodiments.

Figure 3:
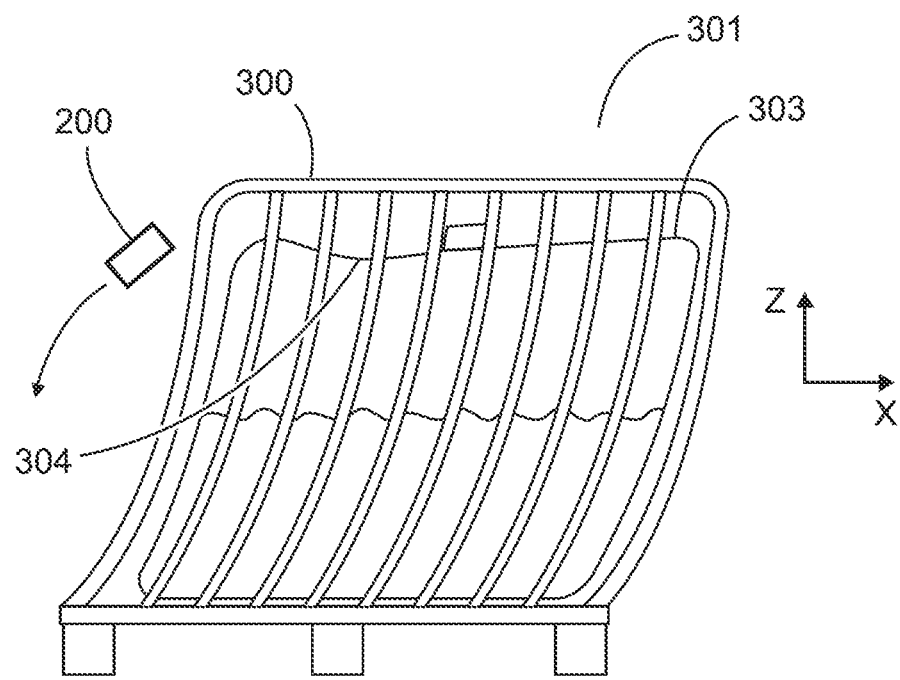
FIG. 3 a schematic view of a deformed container with a fill level measuring device detached.

A well-known disadvantage of such IBCs is the mechanical instability caused by cost and weight optimization. FIG. 3 shows an example of an IBC 301 as it might look like after a collision during a loading or unloading operation, for example. The metal frame 302 has been severely deformed by external mechanical forces. Although the container bladder 303 is still basically intact, it has been mechanically irreversibly deformed by the application of force. As a result, the container surface 304 may also have been strongly deformed in the area where a fill level measuring device, e.g. a radar measuring instrument 200, is located. It may happen that the fastening means, here for example the acrylic adhesive tape 208, is no longer able to provide the necessary mechanical compensation between the fill level measuring device and the container surface, so that the fill level measuring device can detach from the IBC 301 and it may fall to the ground unnoticed. Typically, the fill level measuring devices will remain functional even after the fill level measuring device has been detached from the IBC 301 and hit the floor, i.e. the fill level measuring devices continue to take measurements and transmit these measurements to the data processing equipment 209.

Figure 4:
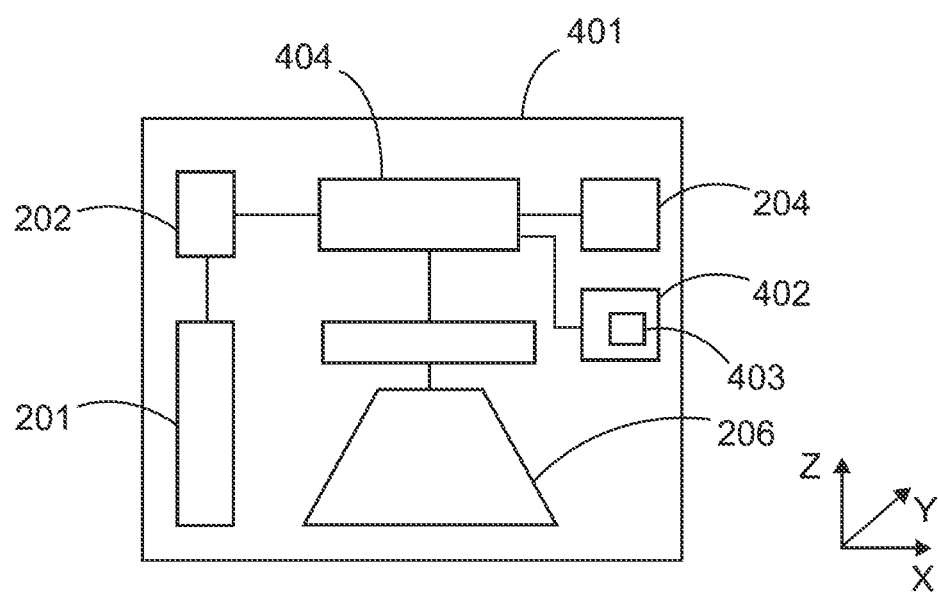
FIG. 4 a schematic view of a first embodiment of a fill level measuring device according to the disclosure.

FIG. 4 shows a first version of a fill level measuring device 401 according to the present disclosure in the form of a radar measuring device 400 with a monitoring means 402 which is arranged to monitor an intended attachment of the fill level measuring device 401 to the container and to detect a container loss, i.e. a loosening of the fill level measuring device 401 from the IBC 301. In the first execution example, the monitoring means 402 comprises at least one acceleration sensor 403, for example a 3-axis acceleration sensor 403. By evaluating the acceleration data of the acceleration sensor 403 in a sequence logic of a processor unit 404, an incorrect positioning or a container loss of the fill level measuring device 401 can be determined.

Figure 5:
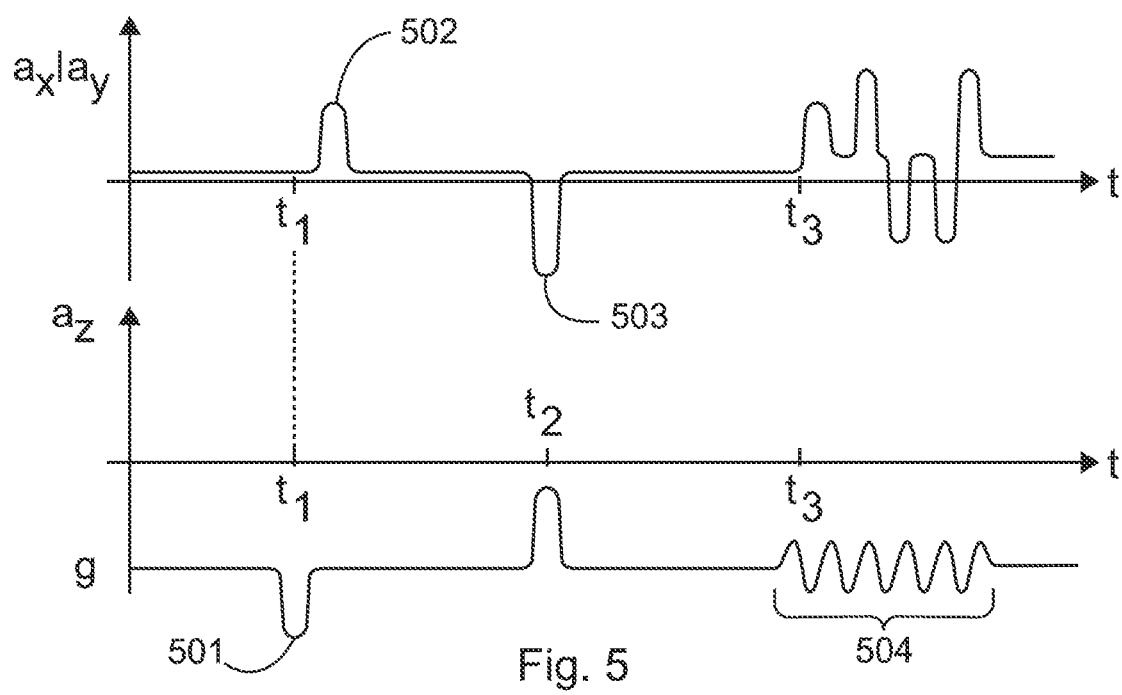
FIG. 5 a schematic view of typical acceleration values occurring during loading and unloading of a container, FIG. 6 a schematic view of typical acceleration values indicating a container loss.
Figure 6:
Figure 7:
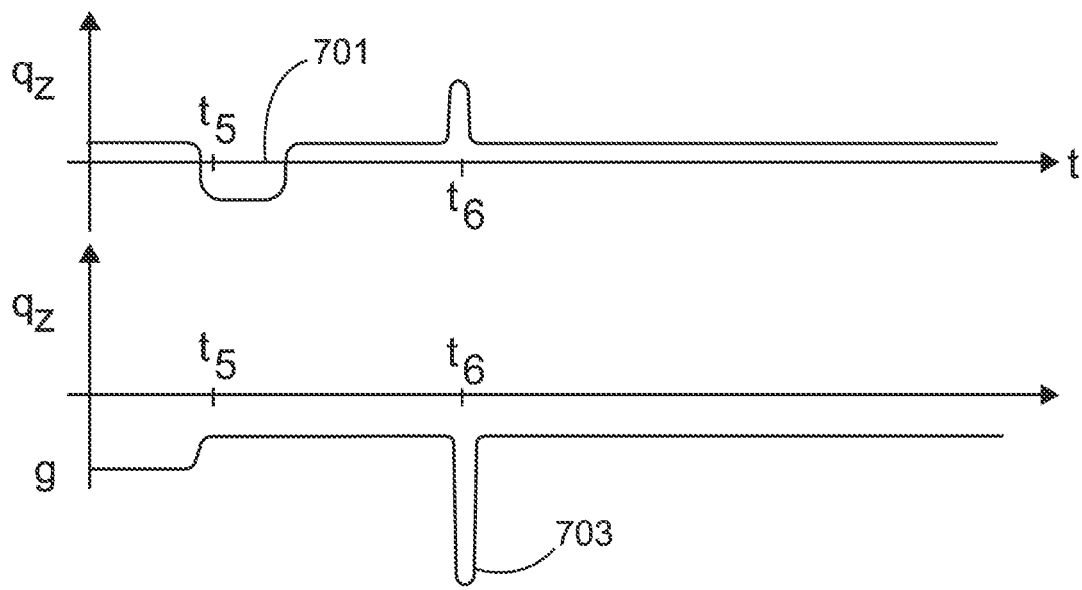
FIG. 7 a schematic view of typical acceleration values indicating a container loss.

FIGS. 5, 6 and 7 show examples of acceleration data recorded by the acceleration sensor 403, which are based on typical movement patterns. FIG. 5 first shows exemplary acceleration values that occur during typical loading and unloading processes of an IBC 101. In the rest state between $t=0$ and $t=t_1$, the sensors measuring in the X and Y directions do not record any acceleration values, whereas the sensor measuring in the Z direction records the acceleration due to gravity g as a negative value with a value of 9.81 m/s². At time $t=t_1$, the IBC 101 is lifted by a forklift truck, which leads to an increase of the negative acceleration value in Z-direction (cf. reference sign 501), since the IBC 101 is still accelerated at the top. Between $t_1$ and $t_2$ the IBC 101 is transported to a truck, for example. The corresponding acceleration values (cf. reference marks 502, 503) can be measured essentially in the X and Y directions. At time $t=t_2$, the IBC 101 is, for example, set down on a truck, which can be deduced from the reduced acceleration in the Z direction. From time t on, the truck is in motion, causing strong deflections of the acceleration sensors in X and Y direction. The slight deviations (cf. reference mark 504) of the Z sensor are caused by travel-related vibrations of the IBC 101. The acceleration curves shown above are characteristic, especially when all three directions are evaluated simultaneously, and can be stored in advance by factory settings in a memory unit assigned to the processor unit 404.

FIG. 6 shows the acceleration data recorded by the accelerometer 403, which reflect a container loss. At time $t=t4$, the Z-component of the acceleration changes to a positive value and remains there in the positive range. From this it can be deduced that a container loss would be present, since the acceleration sensor and thus the fill level measuring device 401 are obviously oriented upwards. Thus, already on the basis of the evaluation of the acceleration data in the Z-direction, it can be determined whether there is a container loss.

As shown in FIG. 7 as an example, in addition to the acceleration data in the Z direction, the acceleration values in the X and Y directions can also be used. In the example shown in FIG. 7, the acceleration sensor and thus the container 401, for example, is subjected to a lateral impact—which leads to the characteristic lateral acceleration pattern (cf. reference sign 701), the duration of which is significantly less than, for example, 1 second. If a decrease in acceleration in the Z-direction (cf. reference mark 702) is detected at the same time, it can be assumed that the accelerometer is moved towards the floor. In order to avoid mix-ups with the acceleration values of a loading operation (cf. FIG. 5), the greatly increased negative acceleration (cf. reference mark 703) can also be taken into account, which reflects the impact of the accelerometer on the floor. The described acceleration pattern thus allows reliable detection of a loosening of the fill level measuring device, i.e. a container loss. In a memory unit assigned to the processor unit 404, further movement patterns can be stored, which are adapted to the respective fields of application of a fill level measuring device according to the disclosure.

Figure 8:
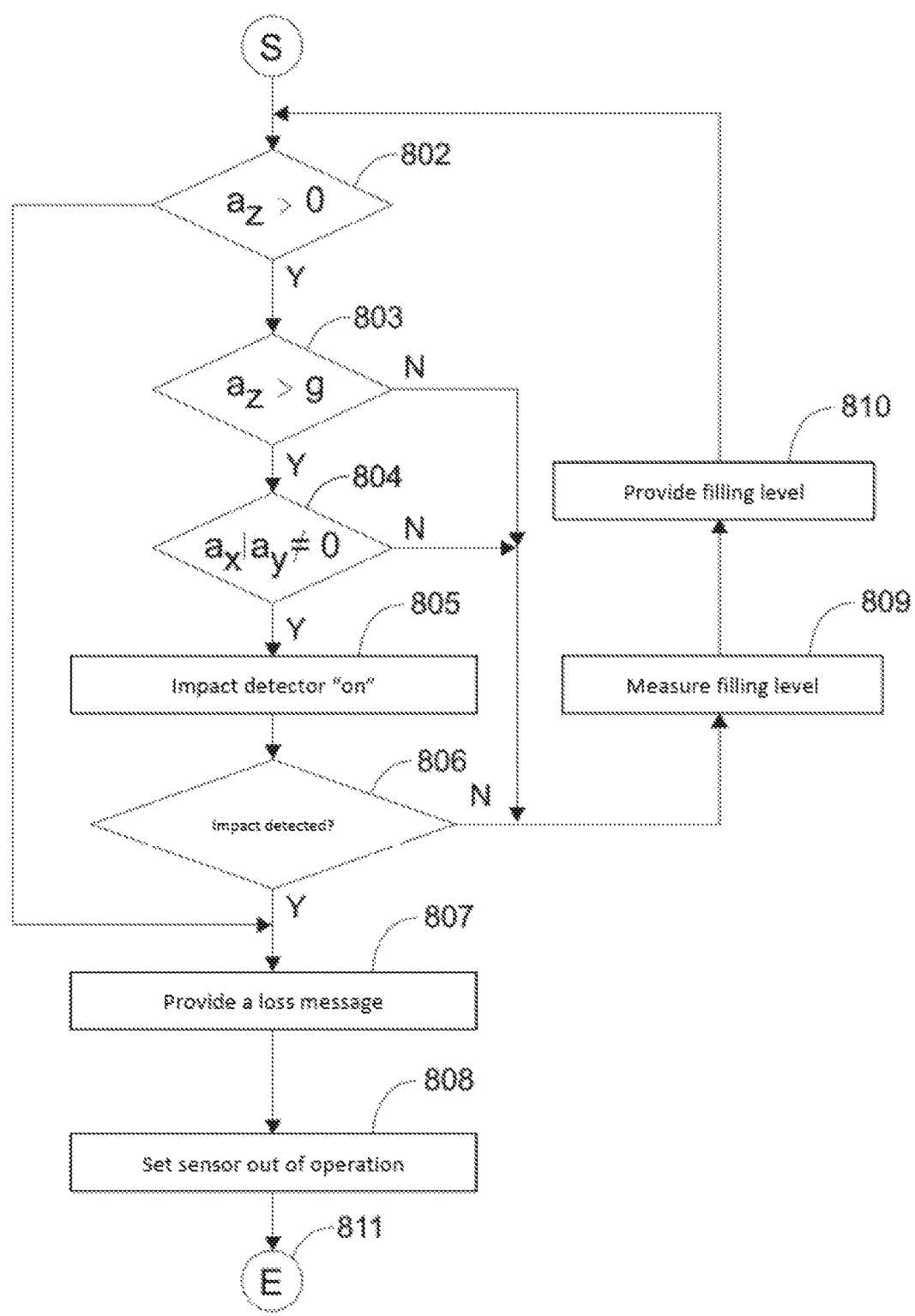
FIG. 8 a program flow when using the first embodiment of a fill level measuring device according to the disclosure.

FIG. 8 shows an example of a program sequence in connection with the first execution example. The sequence begins in the initial state 801. In step 802, the program first checks whether the vertical acceleration is greater than 0. Alternatively, in step 802 it would also be possible to determine whether the vertical acceleration deviates from the expected value of 9.81 m/s$^2$ by a predetermined amount for a predetermined time interval. If this is the case, an alarm message in the form of a container loss message is provided in step 807 via the transmitter/receiver unit 204 and transmitted to a data processing unit, which enables an operator of the fill level measuring device to take appropriate maintenance measures. It is advantageous that the location of the fill level measuring device is also transmitted in the alarm message. Finally, the fill level measuring device is put out of operation in step 808 to avoid faulty measurements. The position data can still be transmitted.

If the check in step 802 does not result in a positive acceleration, step 803 checks whether the vertical acceleration is greater than the negative acceleration due to gravity. If this is not the case, the fill level measuring device is not moved downwards so that a fill level measurement and subsequent data transmission can be started in steps 809 and 810. Otherwise, a further check is made to see whether the lateral acceleration values are not equal to 0. If this is the case, it is assumed that a container loss is just taking place and in step 805 it is determined whether the accelerometer detects an impact, for example a strong deflection in Z direction. If this is the case, process steps 807 and 808 are carried out again. Otherwise there is no container loss and the fill level measuring device determines the fill level by switching to step 809.

Figure 9:
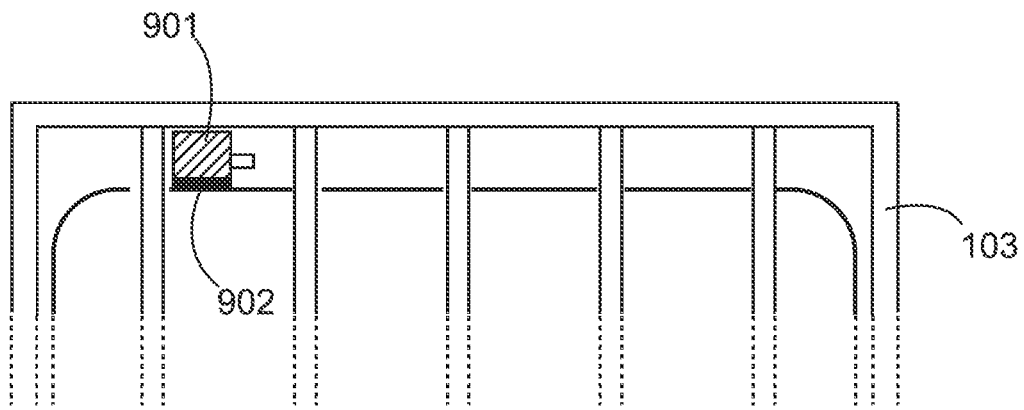
FIG. 9 a schematic view of a second embodiment of a fill level measuring device according to the disclosure.
Figure 10:
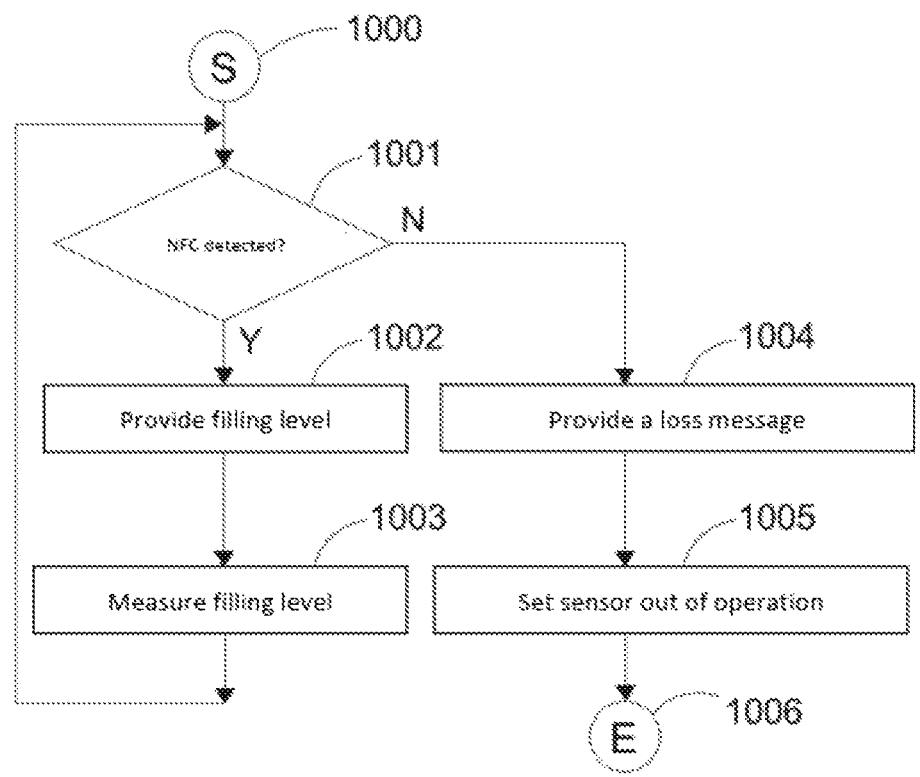
FIG. 10 a program sequence when using the second embodiment of a fill level measuring device according to the disclosure.

FIG. 9 shows a second embodiment of a fill level measuring device 901 according to the present disclosure, which does not use an acceleration sensor but a combined mechanical-electrical detection of a possible container loss. The monitoring device 402 of the fill level measuring device 901 comprises an RFID transmitter/receiver unit or an NFC transmitter/receiver unit 902. Furthermore, a corresponding RFID transmitter/receiver unit or an NFC transmitter/receiver unit is applied to a suitable surface of the IBC 101 so that the corresponding transmitter/receiver units can communicate with each other. Such a transmitting/receiving unit can, for example, be applied to the container bladder 104 by means of a sealing adhesive pad 903. Such a sealing adhesive pad 904 can accommodate an RFID chip or an NFC chip and is still sufficiently flexible so that a detachment of the sealing adhesive pad 903 from the IBC 101 can be effectively prevented in case of container deformation. The transmitter/receiver unit, e.g. an NFC reader or an RFID reader, now checks whether the NFC chip or the RFID chip is located in the immediate vicinity before starting a measurement. FIG. 10 shows an example of a program sequence in connection with the second embodiment. The sequence begins in step 1000. In step 1001 it is first checked whether the corresponding transmitter/receiver units are arranged in the immediate proximity of each other. If this is the case, there is no container loss and the fill level value can be determined by transition to step 1002 and transferred to a data processing unit in step 1003. If however no corresponding emitting/receiving unit is determined in step 1001, a container loss is detected. In this case, an alarm message is transmitted to the data processing unit by transition to step 1004, and in step 1005 the fill level measuring device is taken out of operation.

The solution shown in the second embodiment using close-range transmitting/receiving means can be modified to the extent that, alternatively or additionally, the monitoring means can be equipped with an electrical, optical, magnetic, acoustic and/or mechanical sensor to interact with a detection means provided on the IBC or the fastening unit. For example, it may be intended to verify the presence or an intended arrangement of the sealing adhesive pad 903 on the container bladder 104 electrically (for example by means of an arrangement of one or more conductor tracks on the sealing pad with predetermined breaking point), optically (for example by means of sensors with reflection evaluation), magnetically, acoustically or also mechanically (for example by means of a probe).

Figure 11:
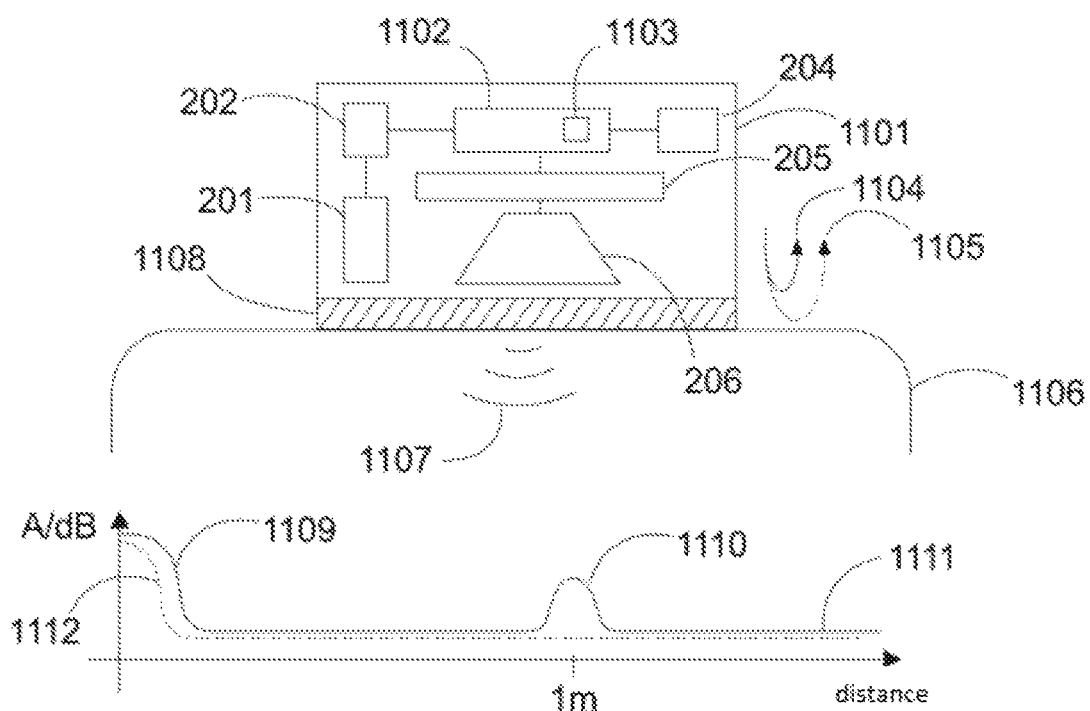
FIG. 11 a schematic view of a third embodiment of a fill level measuring device according to the disclosure.
Figure 12:
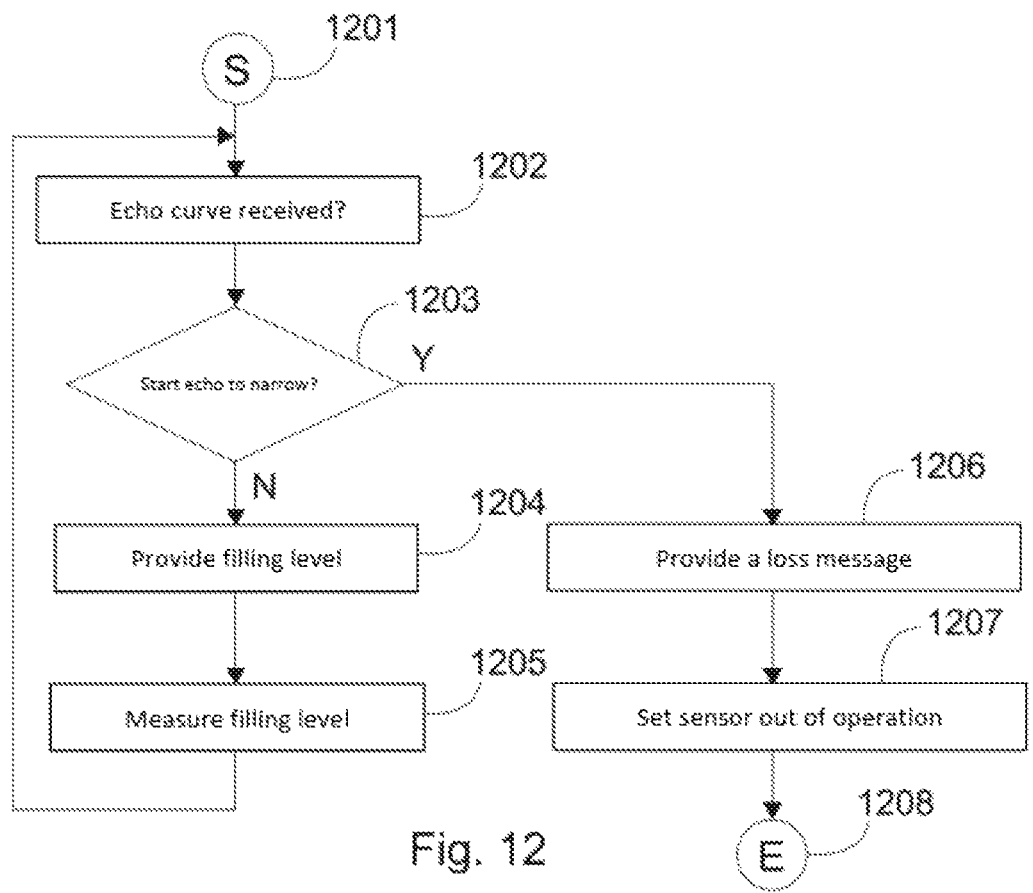
FIG. 12 a program sequence when using the third embodiment of a fill level measuring device according to the disclosure.

FIG. 11 shows a third version of a fill level measuring device 1101 according to the disclosure, which can be used especially when using a radar sensor. When in normal operation the fill level measuring device 1101 is fixed on a surface of the IBC 1106, the radar signal 1107 emitted by the radar antenna 206 is partly reflected at the transition to an adhesive layer 1108 (see reference 1104) and, slightly delayed, again at the transition to the IBC 1106 (see reference 1105). The echoes caused by these reflections are superimposed due to the small spatial distance of the respective reflection points and lead in the reflection pattern to an echo curve 1110 with a characteristically wide echo 1109 at the beginning of the echo curve 1110. In case of a container loss, the second interface or reflection point on IBC 1106 is omitted, which means that the radar antenna 206 receives another echo curve 1111 which is characterized at its beginning by a considerably narrower echo 1112. FIG. 12 shows an example of a program sequence in connection with the third embodiment. The sequence begins in step 1201. In step 1202 an echo curve is first received, and in step 1203 the width of the echo at the beginning of echo curve 1109, 1112 is determined. If the width of the echo at the beginning of the echo curve 1109, 1112 is below a predetermined value, it is assumed that there is a container loss. In this case, an alarm message is generated by a step to the steps 1206, 1207, transmitted to the data processing unit and the fill level measuring device 1101 is put out of operation. Otherwise the filling level is determined in step 1204 and transmitted to the data processing unit in step 1205. For the evaluation and comparison of the different echo curves, the monitoring means comprises a processor unit 1102 with an associated memory means 1103, which are set up to execute a program for the analysis of the echo curves.

It should be noted that the disclosure is not limited to application to an IBC. The present disclosure can be generally applied to receptacles or vessels which are used for the transport of goods/media, for example shipping containers, railway tanks or waste containers. In addition, the above-mentioned loss of containers can also occur in particular when monitoring waters or sewers in the event of flooding or sabotage, so that the present disclosure can also be used there. In the present case, the term container loss is understood to mean a complete detachment of the fill level measuring device from the container or also a change of position from a planned positioning in which no reliable fill level measurement can be carried out.

The present disclosure is not limited to the preceding embodiments as long as it is covered by the subject of the following claims. In particular, the above mentioned embodiments may also be combined with each other in order to be able to determine a container loss with even greater reliability.

The invention claimed is:

1. A fill level measuring device for measuring a fill level of a container, comprising:
a fill level measuring circuit configured to measure a fill level of a container;
at least one transmitter and/or receiver configured to communicate with data processing circuitry;
at least one fastener configured to fasten the fill level measuring device to a surface of the container; and
at least one monitoring circuit configured to monitor a fastening of the fill level measuring device to the container by the at least one fastener,
wherein the at least one monitoring circuit is further configured to transmit an alarm message to the data processing circuitry via the transmitter and/or receiver when the monitoring circuit detects a loosening of the fastening of the fill level measuring device from the container,
wherein the monitoring circuit is further configured to deactivate the fill level measuring device or the fill level measuring circuit after transmission of the alarm message.

2. The fill level measuring device according to claim 1, wherein the transmitter and/or receiver is set up for wireless communication with the data processing circuitry,
wherein the transmitter and/or receiver includes at least one from a group consisting of a wireless area network (WLAN) interface, a Bluetooth interface, a ZigBee interface, a long range wide area network (LoRaWAN) interface, a Sigfox interface, a narrowband IoT (NB-IoT) interface, a MIOTY interface and a mobile radio interface.

3. The fill level measuring device according to claim 1, wherein the fastener includes an acrylic adhesive layer by which the fill level measuring device is mountable to the container.

4. The fill level measuring device according to claim 1, wherein the fastener includes at least one tensioning or band element by which the fill level measuring device is fastenable to the container.

5. The fill level measuring device according to claim 1, wherein the fill level measuring device further comprises at least one position determining circuit selected from a group consisting of at least a global positioning system ("GPS"), the at least one determining circuit configured to transmit position data of the fill level measuring device to the data processing circuitry via the transmitter and/or receiver, and
wherein the alarm message includes position data of the fill level measuring device.

6. The fill level measuring device according to claim 1, wherein the monitoring circuit includes at least one acceleration sensor configured to detect an acceleration of the fill level measuring device at least in a direction parallel to acceleration due to gravity, and
wherein the acceleration sensor is a 3-axis acceleration sensor.

7. The fill level measuring device according to claim 6, wherein the monitoring circuit is configured to evaluate the acceleration values of the acceleration sensor in order to determine whether there is a detachment of the fastening of the fill level measuring device from the container.

8. The fill level measuring device according to claim 1, wherein the monitoring circuit includes a first short-range transmitter and/or receiver configured to wireless communicate with a second short-range transmitter and/or receiver arranged on the container.

9. The fill level measuring device according to claim 8, wherein the first short-range transmitter and/or receiver is a first radio frequency identification "(RFID)" transceiver configured to wirelessly communicate with a second RFID transceiver arranged on the container.

10. The fill level measuring device according to claim 8, wherein the first short-range transmitter and/or receiver is a first near field communication "(NFC)" transceiver configured to wireless communication with a second NFC transceiver arranged on the container.

11. The fill level measuring device according to claim 1, wherein the monitoring circuit includes at least one sensor from a group consisting of an electrical sensor, an optical sensor, a magnetic sensor, an acoustic sensor and a mechanical sensor, the sensor configured to interact with a detection circuit provided on the container or the fastener.

12. The fill level measuring device according to claim 1, wherein the data processing circuitry is further configured to determine a fill level based on a transit time measurement of a signal emitted and reflected onto the fill level measuring device, the signal selected from a group consisting of at least a radar signal and a microwave signal, wherein the monitoring circuit is configured to evaluate the reflected signal to determine whether there is a loosening of the fastening of the fill level measuring device from the container.

13. A system comprising:
a container configured to receive a medium; and
at least one fill level measuring device according to claim 1,
wherein the fill level measuring device is mounted on the container by way of the at least one fastener.

14. The system according to claim 13, wherein the container is a goods/media transport container or a goods/media transport vessel selected from a group consisting of an Intermediate Bulk Container (IBC), a ship container, a railway tank and a waste container.

* * * * *